US012522969B2

(12) United States Patent
Leibman et al.

(10) Patent No.: US 12,522,969 B2
(45) Date of Patent: Jan. 13, 2026

(54) HEATING ASSEMBLY FOR A LAUNDRY TREATMENT APPLIANCE INCLUDING A LIQUID STORAGE TANK

(71) Applicant: Haier US Appliance Solutions, Inc., Wilmington, DE (US)

(72) Inventors: Alexander B. Leibman, Prospect, KY (US); Pavan Kumar Madeti, Hyderabad (IN); Roberto Obregon, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 163 days.

(21) Appl. No.: 18/402,169

(22) Filed: Jan. 2, 2024

(65) Prior Publication Data

US 2025/0215634 A1 Jul. 3, 2025

(51) Int. Cl.

| | |
|---|---|
| ***D06F 39/04*** | (2006.01) |
| ***D06F 29/00*** | (2006.01) |
| ***D06F 34/24*** | (2020.01) |
| ***D06F 39/08*** | (2006.01) |
| ***D06F 58/26*** | (2006.01) |
| ***H05B 6/10*** | (2006.01) |
| *D06F 103/16* | (2020.01) |
| *D06F 105/02* | (2020.01) |

(52) U.S. Cl.

CPC ............ *D06F 39/04* (2013.01); *D06F 29/005* (2013.01); *D06F 34/24* (2020.02); *D06F 39/088* (2013.01); *D06F 58/26* (2013.01); *H05B 6/108* (2013.01); *D06F 2103/16* (2020.02); *D06F 2105/02* (2020.02)

(58) Field of Classification Search

None

See application file for complete search history.

(56) References Cited

U.S. PATENT DOCUMENTS

| | | | |
|---|---|---|---|
| 3,197,886 | A | 8/1965 | Brame et al. |
| 3,545,235 | A | 12/1970 | Menk |
| 4,689,896 | A | 9/1987 | Narang |
| 4,891,892 | A | 1/1990 | Narang |
| 8,276,293 | B2 | 10/2012 | Ricklefs et al. |
| 9,207,014 | B2 | 12/2015 | Ahn et al. |
| 9,267,229 | B2 | 2/2016 | Oh et al. |
| 11,479,895 | B2 | 10/2022 | Hong et al. |

(Continued)

FOREIGN PATENT DOCUMENTS

| | | |
|---|---|---|
| KR | 100709943 B1 | 4/2007 |
| KR | 100745418 B1 | 8/2007 |

(Continued)

*Primary Examiner* — Cristi J Tate-Sims

(74) *Attorney, Agent, or Firm* — Dority & Manning, P.A.

(57) ABSTRACT

A laundry treatment appliance includes a cabinet; a tub positioned within the cabinet, the tub defining a receiving space; and a heating assembly positioned within the cabinet. The heating assembly includes a duct forming an air passageway in fluid communication with the tub, the duct defining an axial direction, a radial direction, and a circumferential direction; a vessel positioned within the duct, the vessel configured to store a quantity of liquid; and a heating element provided around the vessel, the heating element configured to selectively provide heat to the vessel, wherein the heating element is positioned outside of the air passageway.

20 Claims, 8 Drawing Sheets

(56) References Cited

U.S. PATENT DOCUMENTS

| | | | | |
|---|---|---|---|---|
| 2016/0115638 | A1* | 4/2016 | Kim | D06F 58/20 34/604 |
| 2019/0249355 | A1* | 8/2019 | Park | D06F 58/26 |
| 2022/0002929 | A1* | 1/2022 | Yong | D06F 39/04 |

FOREIGN PATENT DOCUMENTS

| | | | |
|---|---|---|---|
| KR | 101114103 | B1 | 2/2012 |
| KR | 101246379 | B1 | 3/2013 |
| KR | 101435808 | B1 | 8/2014 |

* cited by examiner

HEATING ASSEMBLY FOR A LAUNDRY TREATMENT APPLIANCE INCLUDING A LIQUID STORAGE TANK

FIELD OF THE INVENTION

The present subject matter relates generally to home appliances, and more particularly to heating assemblies for laundry treatment appliances.

BACKGROUND OF THE INVENTION

Laundry treatment appliances may perform one or more laundry operations, such as washing and/or drying. As such, laundry treatment appliances generally include a cabinet with a drum rotatably mounted therein. During operation, a motor rotates the drum, e.g., to tumble articles located within a chamber defined by the drum. Laundry appliances capable of performing a drying operation also generally include a heater assembly that passes heated air through the chamber in order to dry moisture-laden articles positioned therein. Typically, an air handler or blower is used to urge the flow of heated air from chamber, through a trap duct, and to the exhaust duct where it is exhausted from the dryer appliance. Dryer appliances may further include filter systems for removing foreign materials, such as lint, from passing into the exhaust conduit, which can impair dryer performance and may present a fire hazard due to the potential for combustion.

Conventional heater assemblies include electrical resistance heaters such as wire coils that generate heat when electrical current is passed through them. Notably, these resistance heaters are typically only 70-80% efficient, resulting in significant wasted energy during operation. In addition, large gradients are formed in the air supplied to the drum, resulting in hot spots which may damage articles in the drum, and cold spots which may be ineffective at drying the articles. Therefore, the temperature within the drum may not be controlled linearly, resulting in significant operating restrictions and limited versatility in terms of using different operating cycles to dry various load types.

Accordingly, a laundry treatment appliance which obviates one or more of the above-mentioned drawbacks would be desirable. In particular, laundry treatment appliances including features for efficiently providing heat to air supplied to the drum would be beneficial.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a laundry treatment appliance is provided. The laundry treatment appliance may include a cabinet; a tub positioned within the cabinet, the tub defining a receiving space; and a heating assembly positioned within the cabinet. The heating assembly may include a duct forming an air passageway in fluid communication with the tub, the duct defining an axial direction, a radial direction, and a circumferential direction; a vessel positioned within the duct, the vessel configured to store a quantity of liquid; and a heating element provided around the vessel, the heating element configured to selectively provide heat to the vessel, wherein the heating element is positioned outside of the air passageway.

In another exemplary aspect of the present disclosure, a heating assembly for a laundry treatment appliance is provided. The laundry treatment appliance may include a drum. The heating assembly may include a duct forming an air passageway in fluid communication with the drum, the duct defining an axial direction, a radial direction, and a circumferential direction; a liquid vessel positioned within the duct, the liquid vessel configured to store a quantity of liquid, the liquid vessel being fluidly isolated from the air passageway; a heating element provided around the liquid vessel, the heating element configured to selectively provide heat to the liquid vessel, wherein the heating element is positioned outside of the air passageway; and a sleeve positioned around the heating element such that the heating element is positioned between the sleeve and the liquid vessel, wherein the sleeve is tapered toward an upstream end of the air passageway along the axial direction.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
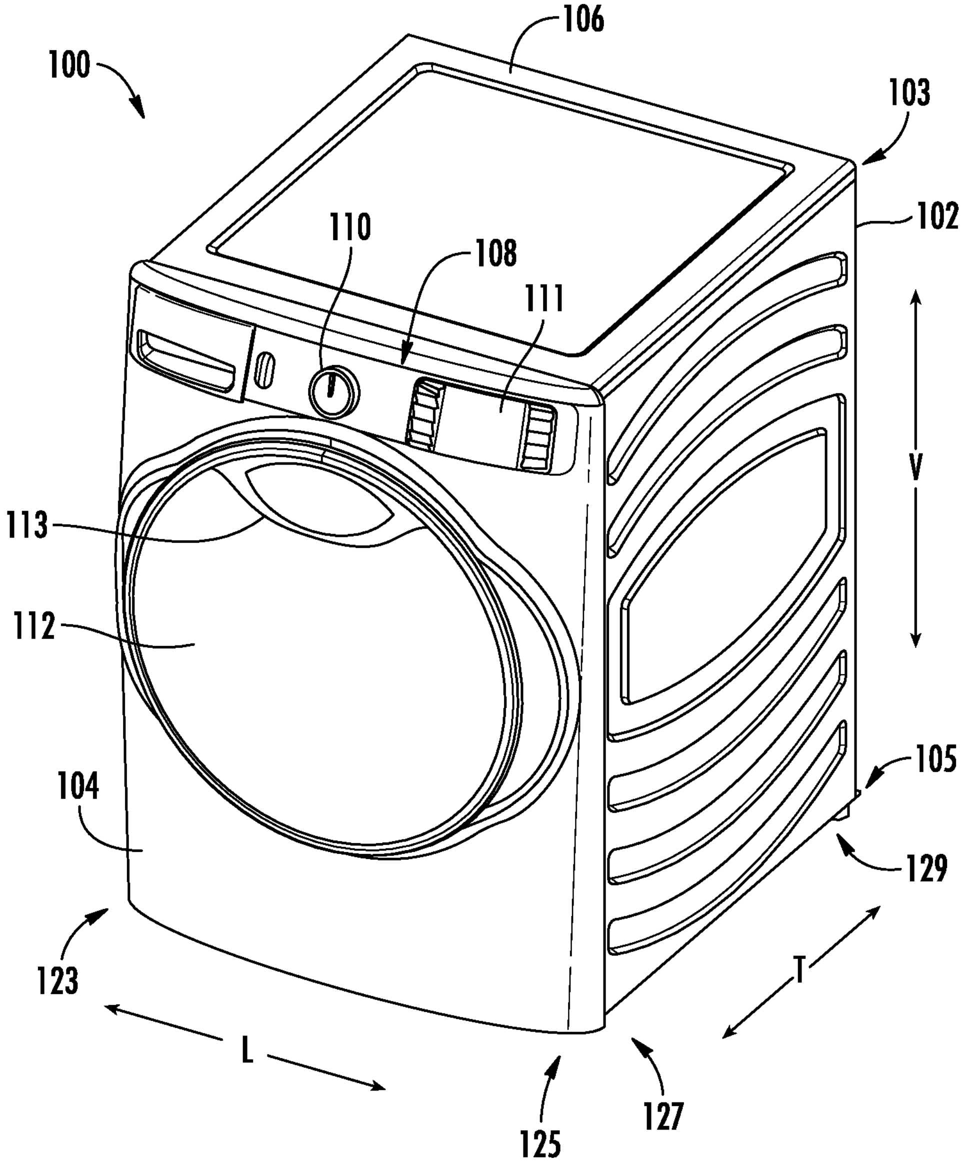
FIG. 1 provides a front perspective view of a laundry treatment appliance according to exemplary embodiments of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms “first,” “second,” and “third” may be used interchangeably to distinguish one component from another and are not intended to signify location or importance of the individual components. The terms “includes” and “including” are intended to be inclusive in a manner similar to the term “comprising.” Similarly, the term “or” is generally intended to be inclusive (i.e., “A or B” is intended to mean “A or B or both”). In addition, here and throughout the specification and claims, range limitations may be combined and/or interchanged. Such ranges are identified and include all the sub-ranges contained therein unless context or language indicates otherwise. For example, all ranges disclosed herein are inclusive of the endpoints, and the endpoints are independently combinable with each other. The singular forms “a,” “an,” and “the” include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as “generally,” “about,” “approximately,” and “substantially,” are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction, e.g., “generally vertical” includes forming an angle of up to ten degrees in any direction, e.g., clockwise or counterclockwise, with the vertical direction V.

The word “exemplary” is used herein to mean “serving as an example, instance, or illustration.” In addition, references to “an embodiment” or “one embodiment” does not necessarily refer to the same embodiment, although it may. Any implementation described herein as “exemplary” or “an embodiment” is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
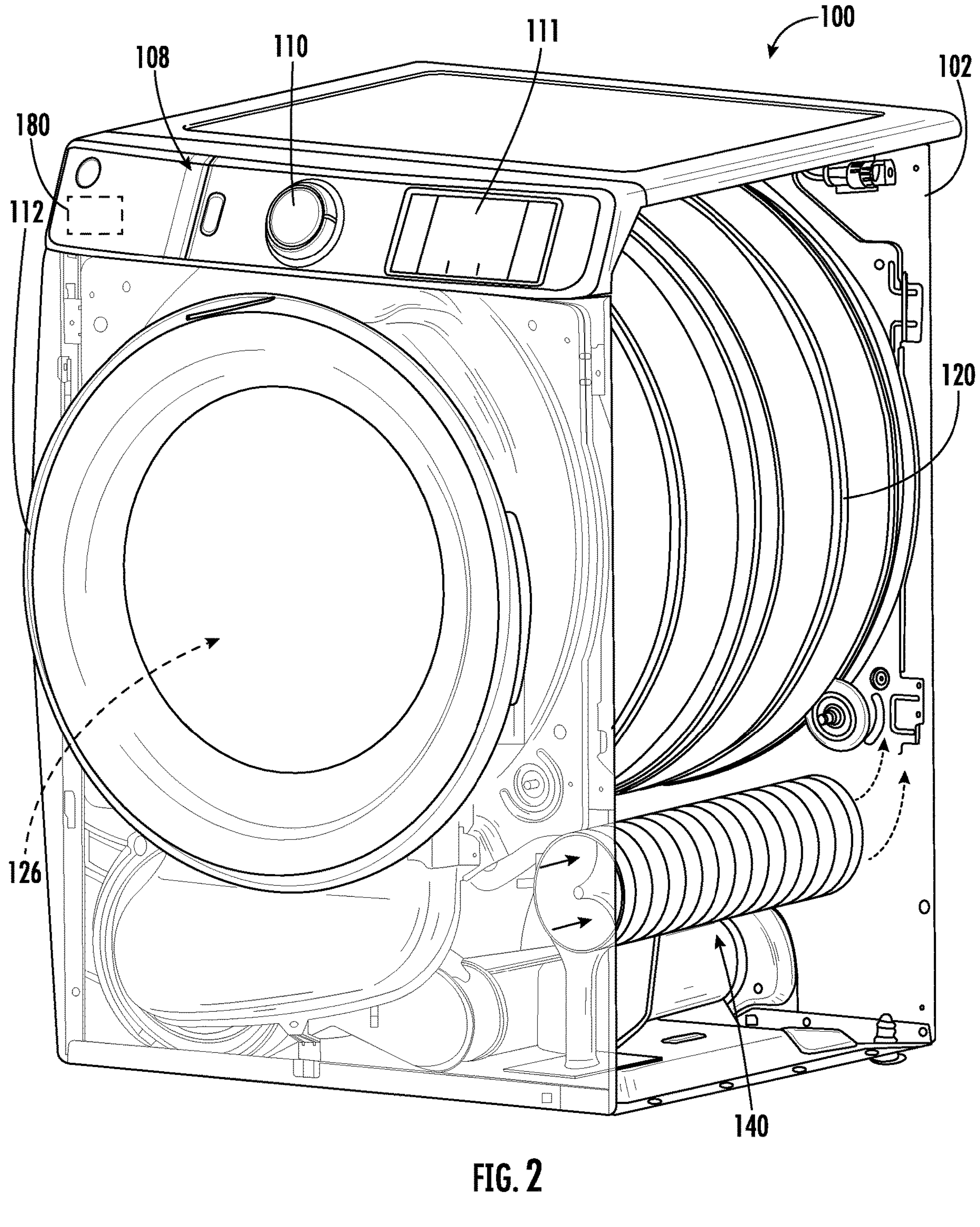
FIG. 2 provides a front perspective view of the laundry treatment appliance of FIG. 1 with a side panel removed for clarity.

FIGS. 1 and 2 provide various views of an exemplary horizontal axis laundry treatment appliance 100 according to one exemplary embodiment of the present disclosure. For instance, laundry treatment appliance 100 may perform each of a wash cycle or operation and a drying cycle or operation. In particular, FIG. 1 provides a front, perspective view of horizontal axis laundry treatment appliance 100 and FIG. 2 provides a side, section view of laundry treatment appliance 100. As shown in FIG. 1, laundry treatment appliance 100 includes a cabinet 102 that extends between a top 103 and a bottom 105, e.g., along a vertical direction V. Cabinet 102 also extends between a first side 123 and a second side 125, e.g., along a lateral direction L, and between a front 127 and a rear 129, e.g., along a transverse direction T. The vertical, lateral, and transverse directions V, L, T defined by laundry treatment appliance 100 are mutually perpendicular and together define an orthogonal direction system.

Cabinet 102 includes a front panel 104. A door 112 is mounted to front panel 104 and is rotatable between an open position (not shown) facilitating access to a wash drum or basket 120 (FIG. 2) located within cabinet 102, and a closed position (shown in FIGS. 1 and 2) hindering access to basket 120. A user may pull on a handle 113 in order to selectively adjust door 112 between the open and closed positions. Cabinet 102 also includes a top panel 106 positioned at top 103 of cabinet 102.

A control panel 108 including a plurality of input selectors 110 is coupled to front panel 104. Control panel 108 and input selectors 110 collectively form a user interface input for operator selection of machine cycles and features. For example, in some embodiments, control panel 108 includes a display 111 (FIG. 1) configured to present or indicate selected features, a countdown timer, and/or other items of interest to machine users.

Operation of laundry treatment appliance 100 may be controlled by a processing device or controller 180 that is operatively coupled to control panel 108 for user manipulation to select washing and/or drying cycles and features. In response to user manipulation of control panel 108, controller 180 may operate the various components of laundry treatment appliance 100 to execute selected machine cycles and features.

Controller 180 may include a memory and microprocessor, such as a general or special purpose microprocessor operable to execute programming instructions or micro-control code associated with a cleaning cycle. The memory may represent random access memory such as DRAM, or read only memory such as ROM or FLASH. In one embodiment, the processor executes programming instructions stored in memory. The memory may be a separate component from the processor or may be included onboard within the processor. Alternatively, controller 180 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software. Control panel 108 and other components of laundry treatment appliance 100 may be in communication with controller 180 via one or more signal lines or shared communication busses.

While described in the context of a specific embodiment of horizontal axis laundry treatment appliance 100, it will be understood that horizontal axis laundry treatment appliance 100 is provided by way of example only. Other laundry treatment appliances having different configurations, different appearances, and/or different features may also be utilized with the present subject matter, including, for example, vertical axis laundry treatment appliances. Other combination washing machine or dryer appliances having different configurations, different appearances, or different features may also be utilized with the present subject matter as well. Thus, the teachings of the present disclosure are not limited to use with laundry treatment appliance 100.

With reference to FIG. 2, laundry treatment appliance 100 may be a dryer appliance. For instance, a dryer drum 120 may be received within cabinet 102 and define a drying chamber 126 that is configured for receipt of articles for drying. More specifically, dryer drum 120 may be rotatably mounted within cabinet 102 such that it is rotatable about a rotation axis. Generally, the rotation axis is defined non-parallel to the vertical direction V (e.g., closer to perpendicular than parallel). Dryer drum 120 may define one or more features that extend into drying chamber 126 to assist in tumbling articles disposed within drying chamber 126 during operation of dryer appliance 100. For example, a plurality of baffles may extend from dryer drum 120 into drying chamber 126. In this manner, for example, the baffles may lift articles disposed in dryer drum 120 during rotation of dryer drum 120.

Figure 3:
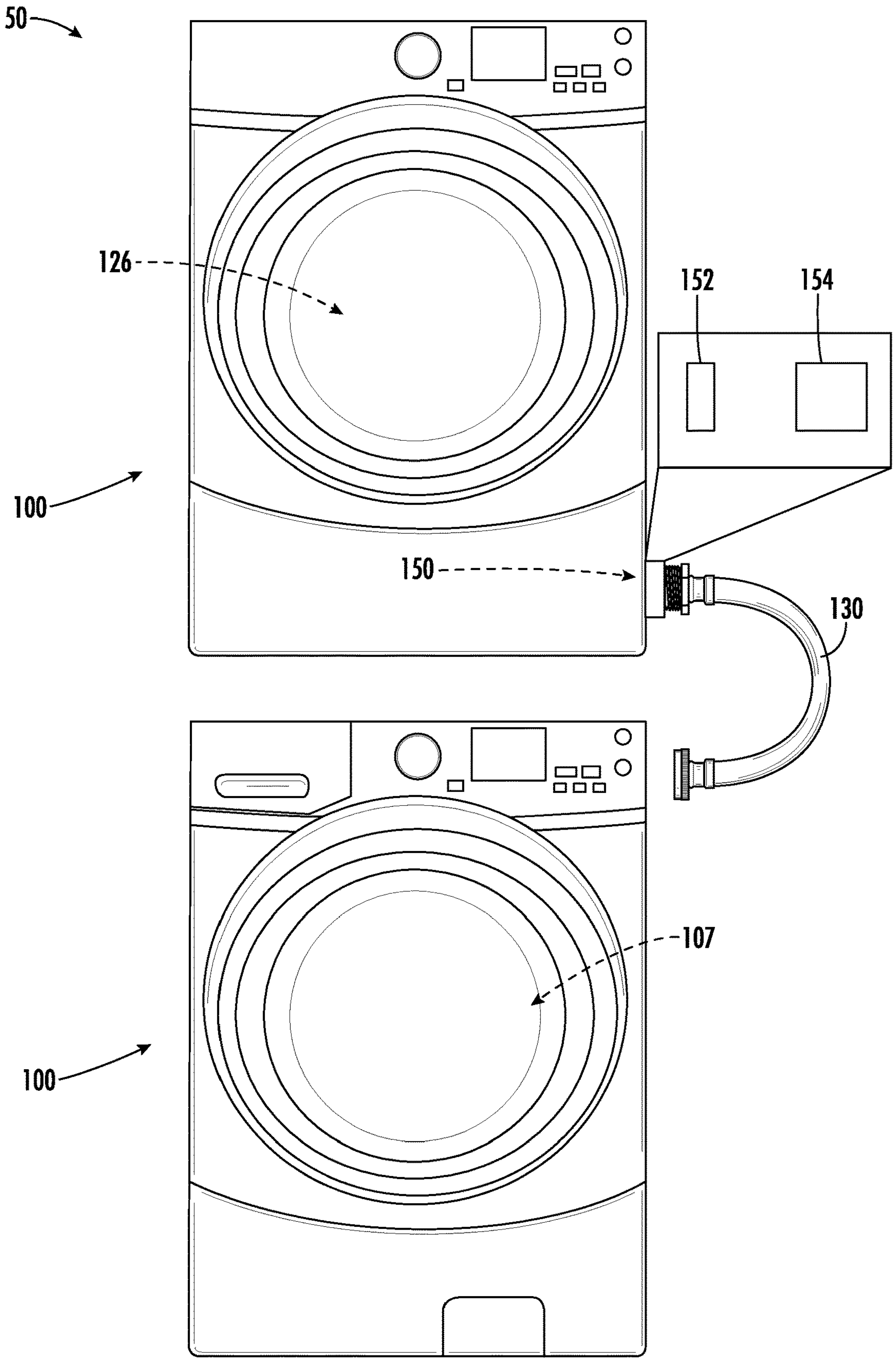
FIG. 3 provides a front view of an exemplary laundry system including the laundry treatment appliance of FIG. 1.

According to some embodiments (e.g., as shown in FIG. 3), laundry treatment appliance 100 may be incorporated into a stacked appliance system 50. For instance, laundry treatment appliance 100 may be a dryer appliance positioned on top of a washing machine appliance 101. As would be understood, washing machine appliance 101 may include a tub (e.g., a wash tub) 107 positioned therein. Wash tub 107 may be configured to receive articles for washing along with a quantity of water and detergent to perform a washing operation. Dryer appliance 100 and washing machine appliance 101 may be operably connected with one another. For instance, as will be explained in further detail below, dryer appliance 100 may be connected to washing machine appliance 101 via one or more conduits 130. Additionally or alternatively, dryer appliance 100 and washing machine appliance 101 may be connected via one or more fasteners, may be remotely connected (e.g., via a remote network connection), or the like. Moreover, the stacked position of appliance system 50 is provided by way of example only, and dryer appliance 100 and washing machine appliance 101 may be positioned in a side-by-side manner or any other suitable arrangement allowing a connection.

Figure 6:
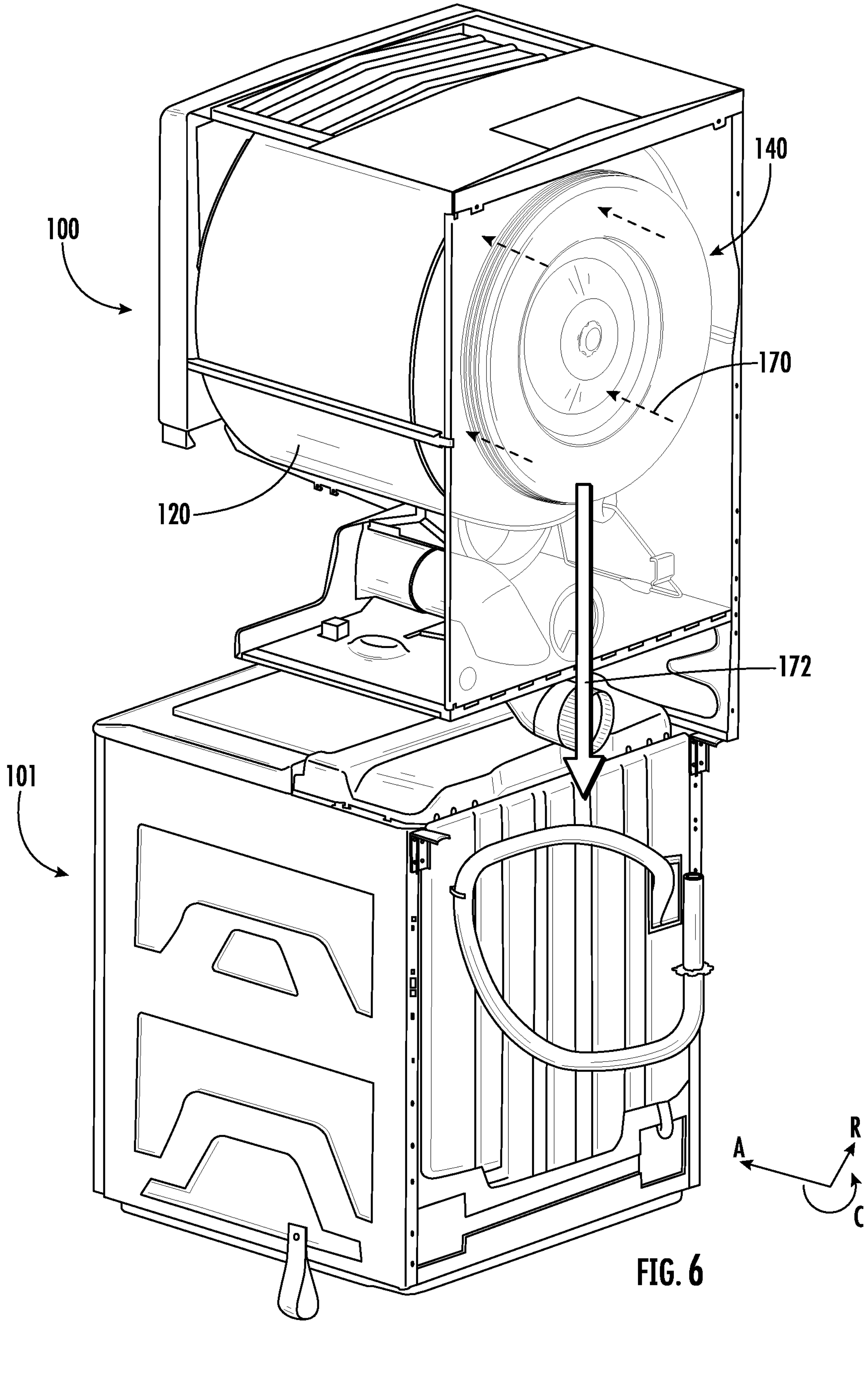
FIG. 6 provides a rear perspective view of the laundry system of FIG. 3 according to another embodiment of the present disclosure.
Figure 7:
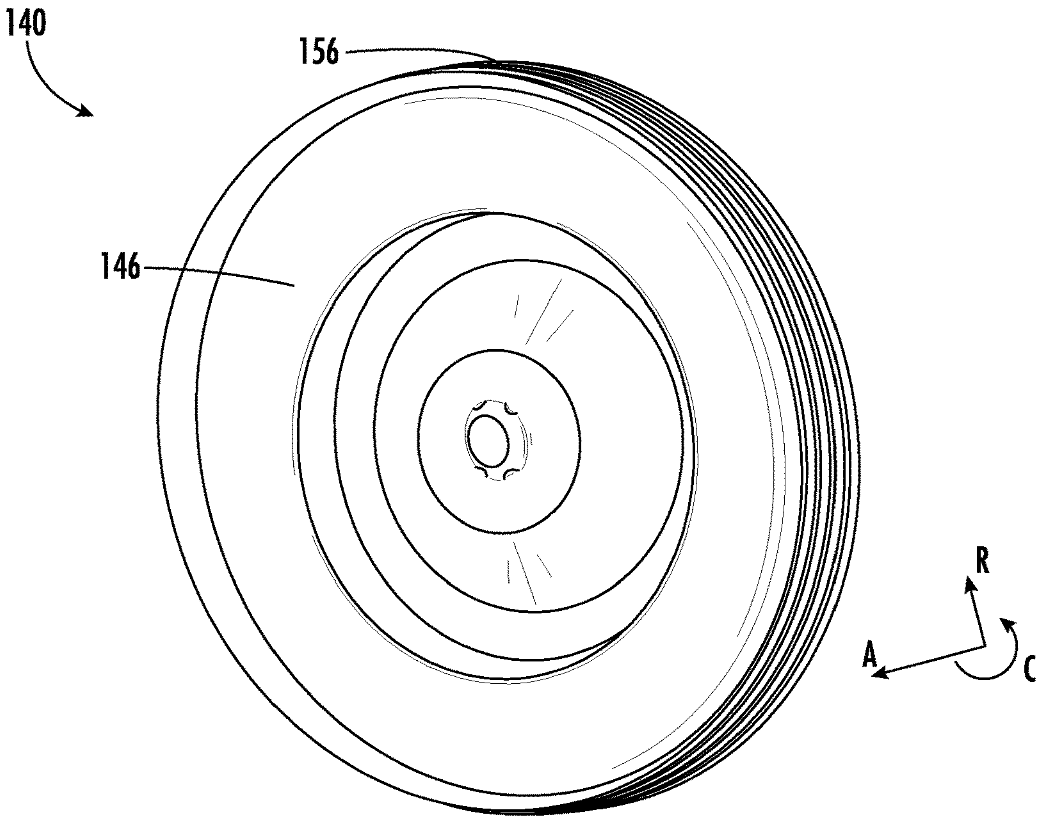
FIG. 7 provides a front perspective view of a heating assembly according to another embodiment of the present disclosure.
Figure 8:
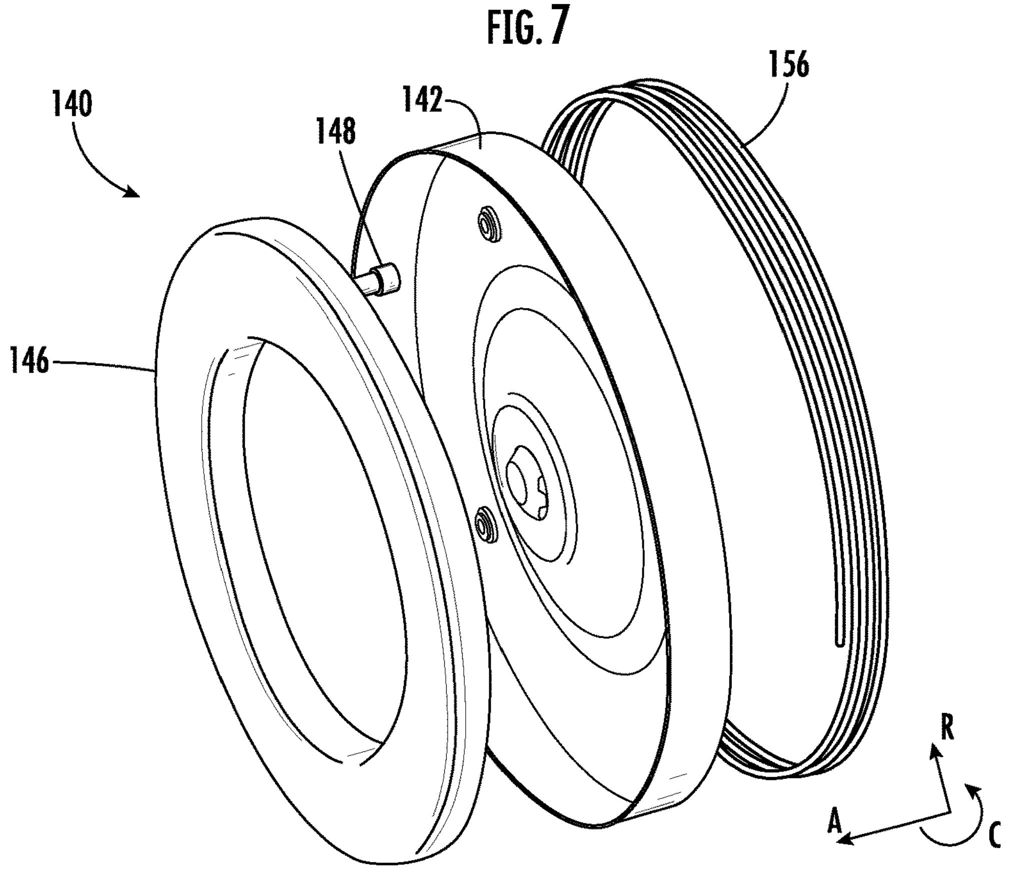
FIG. 8 provides an exploded view of the exemplary heating assembly of FIG. 7.

Laundry treatment appliance 100 may include a heating assembly 140. Heating assembly 140 may be positioned within cabinet 102. Heating assembly 140 may be in fluid communication with drum 120. For instance, heating assembly 140 may be configured to provide heat to air which is then supplied to drum 120 to remove moisture from articles positioned within drum 120. According to at least some embodiments, heating assembly 140 includes an air handler (e.g., a fan) configured to force or urge air through a ducting system. As shown in FIG. 2, for instance, heating assembly 140 may be positioned at a lower lateral side within cabinet 102. In additional or alternative embodiments, for instance as shown in FIG. 6, heating assembly 140 may be positioned at a rear of drum 120. It should be understood that a placement of heating assembly 140 may vary according to specific embodiments, and the disclosure is not limited to the examples provided herein.

Figure 4:
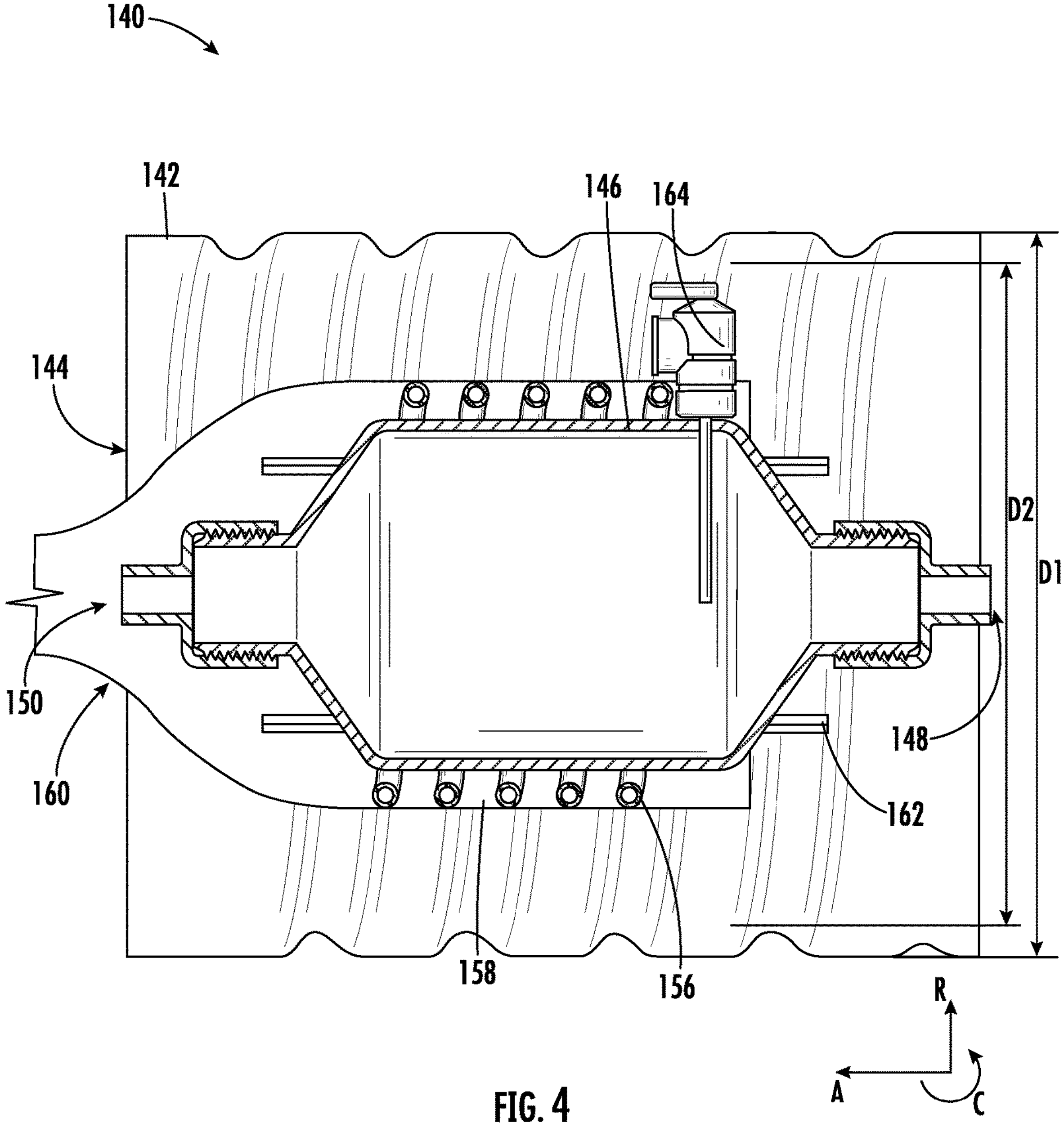
FIG. 4 provides a side cut-away view of a heating assembly according to exemplary aspects of the present disclosure.
Figure 5:
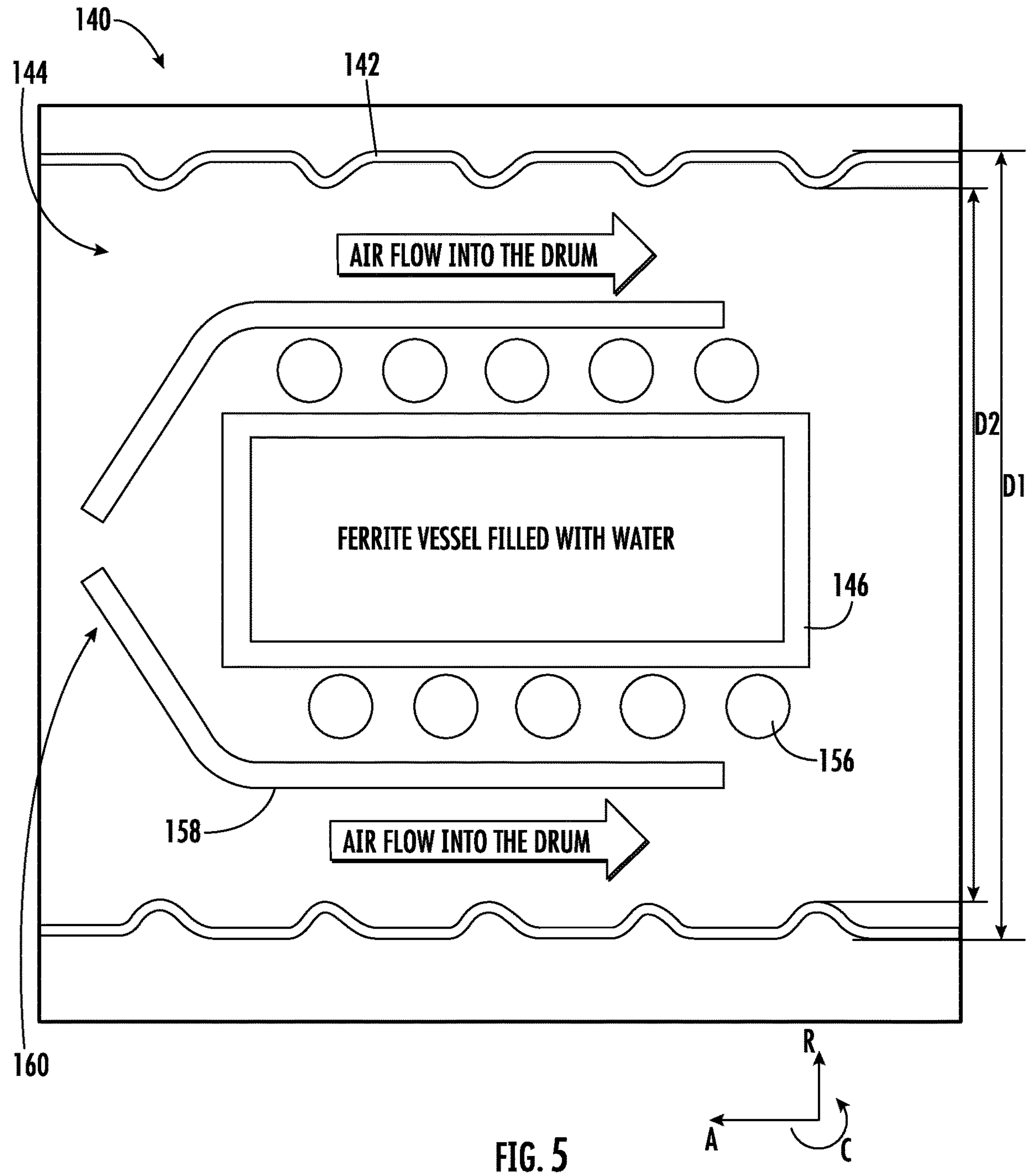
FIG. 5 provides a schematic view of the exemplary heating assembly of FIG. 4 according to another embodiment.

Referring now primarily to FIGS. 4 and 5, an embodiment of heating assembly 140 will be described in detail. As mentioned, heating assembly 140 may include a duct 142. Duct 142 may define an air passageway 144 through which air passes (e.g., during a drying operation). Air passageway 144 may be in fluid communication with drum 120. For instance, air passageway 144 may define an inlet and an outlet, such that warm or hot air exits air passageway 144 via the outlet and enters drum 120. According to some embodiments, duct 142 is predominantly cylindrical in shape. For instance, duct 142 may define an axial direction A, a radial direction R, and a circumferential direction C. Air may flow through air passageway 144 along the axial direction A.

Duct 142 may be a corrugated duct. For instance, duct 142 may define a helix pattern along the axial direction A (e.g., from the inlet toward the outlet). As such, one or more ridges may be formed into duct 142 (e.g., along the radial direction R). Additionally or alternatively, a plurality of parallel ridges may be formed into duct 142. For instance, the plurality of ridges may be spaced along the axial direction A from the inlet toward the outlet of duct 142. As such, duct 142 may define an outer diameter D1 and an inner diameter D2 such that outer diameter D1 is greater than inner diameter D2. Advantageously, air flowing through air passageway 144 may be subjected to a swirling effect, resulting in increased mixture and reduced temperature gradients within the air entering drum 120.

Heating assembly 140 may include a vessel or liquid vessel 146. Vessel 146 may be positioned within duct 142. Vessel 146 may be configured to store a quantity of liquid (e.g., water) therein. For instance, vessel 146 may be a tank, container, cartridge, reservoir, or other liquid-tight case capable of containing a liquid. Vessel 146 may be formed from a ferrite or ferrous material. For instance, vessel 146 may exhibit magnetic and metallic properties. Accordingly, vessel 146 may interact with magnetic fields formed therearound.

Vessel 146 may be positioned at or near a radial center of air passageway 144. Moreover, vessel 146 may extend along the axial direction A within air passageway 144. Accordingly, air flowing through air passageway 144 may flow around vessel 146 (e.g., along the radial direction R). In other words, the air within air passageway 144 may flow in the axial direction A between vessel 146 and duct 142 along the radial direction R.

Vessel 146 may include a water inlet or liquid inlet 148. Water inlet 148 may provide fluid communication between an interior of vessel 146 and a water supply source (e.g., a municipal water supply, a faucet, etc.). Water inlet 148 may include one or more valves which selectively open and close water inlet 148. For instance, water inlet 148 (e.g., a valve) may be operable connected with controller 180. As such, water inlet 148 may receive signals from controller 180 to open to allow water into vessel 146 and to close to restrict fluid access to vessel 146.

Vessel 146 may include a water outlet or liquid outlet 150. Water outlet 150 may be provided in addition to or alternatively from water inlet 148. Water outlet 150 may include one or more valves which selectively open and close water outlet 150. For instance, water outlet 150 (e.g., a valve) may be operable connected with controller 180. As such, water outlet 150 may receive signals from controller 180 to open to allow water out of vessel 146 and to close to restrict fluid access to vessel 146. As shown in FIG. 3, water outlet 150 may be connected with washing machine appliance 101 of appliance system 50. For instance, conduit 130 may be fluidly connected to water outlet 150 such that water (e.g., heated water) or fluid stored within vessel 146 may be optionally supplied to a tub (e.g., a wash tub) of appliance 101 (e.g., for use in a washing operation).

A temperature sensor 152 may be incorporated into appliance system 50. For instance, with reference to FIG. 3, temperature sensor 152 may be in fluid communication between vessel 146 and appliance 101. Accordingly, a temperature of the water stored within vessel 146 may be monitored or measured by temperature sensor 152. As used herein, "temperature sensor" or the equivalent is intended to refer to any suitable type of temperature measuring system or device positioned at any suitable location for measuring the desired temperature. Thus, for example, temperature sensor 152 may each be any suitable type of temperature sensor, such as a thermistor, a thermostat, a thermocouple, a resistance temperature detector, a semiconductor-based integrated circuit temperature sensors, etc. In addition, temperature sensor 152 may be positioned at any suitable location and may output a signal, such as a voltage, to a controller that is proportional to and/or indicative of the temperature being measured. Although exemplary positioning of temperature sensors is described herein, it should be appreciated that appliance system 50 may include any other suitable number, type, and position of temperature, humidity, and/or other sensors according to alternative embodiments.

A valve 154 may be incorporated into appliance system 50. Referring still to FIG. 3, valve 154 may be in fluid communication with temperature sensor 152 and conduit 130. For instance, valve 154 may be operably connected with conduit 130 downstream from temperature sensor 152. Valve 154 may be operably connected with controller 180. In detail, valve 154 may be selectively opened and closed according to signals received from controller 180. As controller 180 is operably connected with temperature sensor 152, valve 154 may be operated (e.g., opened or closed) according to a temperature sensed at temperature sensor 152 (e.g., a temperature of the water within vessel 146).

According to an embodiment, for example, a washing operation may be initiated at washing machine appliance 101. A controller (e.g., controller 180) may determine a temperature of the water stored within vessel 146 upon receiving the initiation signal. If the temperature is above a predetermined temperature, the controller may open valve 154 to allow the heated water from vessel 146 into washing machine appliance 101. In the instance the temperature of the water within vessel 146 is below the predetermined temperature, the controller may maintain valve 154 in the closed position.

Heating assembly 140 may include a heating element 156. Heating element 156 may be provided around vessel 146. For instance, heating element 156 may be wrapped around vessel 146 in a coil shape. Heating element 156 may thus be provided as a coil extending along the circumferential direction C around vessel 146 and along the axial direction A. Heating element 156 may be connected to a power source to receive power therefrom (e.g., a voltage). Heating element 156 may thus selectively provide heat or energy to vessel 146.

According to at least some embodiments, heating element 156 is an induction heating element. In detail, induction heating element 156 may generate a magnetic field to excite or energize certain items (e.g., such as vessel 146), causing the item to heat up. Induction heating element 156 may include a Lenz coil or wire. As will be understood by those skilled in the art, appliance 100 may supply a current to induction heating element 156. As such, current may pass through the Lenz coil and generate a magnetic field. The magnetic field may be a high frequency circulating magnetic field. As shown in FIGS. 4 and 5, induction heating element 156 may be oriented such that the magnetic field is directed towards and through vessel 146. In particular, when the magnetic field penetrates vessel 146, the magnetic field induces a circulating electrical current within vessel 146. Accordingly, vessel 146 may include a ferrous or ferrite material. The material properties of vessel 146 may restrict a flow of the induced electrical current and convert the induced electrical current into heat within vessel 146. As vessel 146 heats up, liquid (e.g., water) within vessel 146 may heat up as well. In such a manner, induction heating element 156 can heat the water within vessel 146.

Heating assembly 140 may include a sleeve 158. Sleeve 158 may be positioned around heating element 156. For instance, heating element 156 may be positioned between vessel 146 and sleeve 158. Accordingly, sleeve 158 may function as a dust cover to prevent debris (e.g., lint, dust, particles, etc.) from contacting heating element 156. Sleeve 158 may include a ferrous or ferrite material (e.g., similar to vessel 146). Accordingly, sleeve 158 may generate heat when subjected to the magnetic field created by induction heating element 156. Sleeve 158 may extend along the circumferential direction C around each of vessel 146 and heating element 156, and along the axial direction A. As such, as seen in FIG. 4, air passageway 144 may be defined radially outward from sleeve 158 (e.g., between sleeve 158 and duct 142 along the radial direction R). As sleeve 158 is heated via heating element 156 (e.g., induction heating element 156), air flowing through air passageway 144 may be heated before being supplied to drum 120. Air passageway 144 may thus form an air stream radially outward from sleeve 158 and circumferentially around sleeve 158 (e.g., between sleeve 158 and duct 142). Advantageously, the air flowing through air passageway 144 may swirl around sleeve 158 to ensure even and complete heating of the air.

Sleeve 158 may include a tapered portion 160. For instance, sleeve 158 may taper toward an upstream end of air passageway 144 (e.g., along the axial direction A). Accordingly, tapered portion 160 may be radially shorter than sleeve 158. According to some embodiments, tapered portion 160 tapers to a point such that no air flows into sleeve 158. As such, heating element 156 may be positioned outside of air passageway 144. Advantageously, air containing particles such as lint may be prevented from contacting heating element 156 or vessel 146.

Heating assembly 140 may include a coil spacer 162. Coil spacer 162 me be positioned between heating element 156 and vessel 146. Accordingly, heating element 156 may be maintained at a predetermined distance away from vessel 146. In other words, heating element 156 may be spaced apart from vessel 146. Coil spacer 162 may include one or more shafts, for instance, extending along the axial direction A. Coil spacer 162 may include a non-conducting material. Thus, coil spacer 162 may be non-reactive with respect to heating element 156 (e.g., when heating element 156 is the induction heating element 156). Additionally or alternatively, an air gap may be formed between spacer 162 and sleeve 158 (e.g., in which heating element 156 is positioned). Thus, as mentioned above, heating element 156 is maintained outside of air passageway 144 and away from vessel 146.

Heating assembly 140 may include a relief valve 164. Relief valve 164 may be a pressure relief valve. For instance, relief valve 164 may be in fluid communication with the interior space of vessel 146. Relief valve 164 may thus control or limit a pressure within vessel 146. As would be understood, relief valve 164 may selectively allow a release of high pressure fluid (e.g., steam) built up within vessel 146. Relief valve 164 may thus include one or more elements configured to open upon being subjected to a predetermined pressure. Relief valve 164 may selectively release the fluid from the vessel to an ambient atmosphere. According to some embodiments, relief valve 164 releases the fluid into air passageway 144. However, a release point of relief valve 164 may be provided at any suitable location and the disclosure is not limited to the examples provided herein.

Turning now to FIGS. 6 through 9, another embodiment of the present disclosure will be described. Like numbers may refer to like elements where appropriate. Accordingly, detailed descriptions of like elements will be omitted for the sake of brevity. As seen in FIGS. 6 through 9, heating assembly 140 may be positioned at or near a rear of drum 120 of appliance 100. According to this embodiment, heating assembly 140 may be generally circular shaped, defining an axial direction A parallel with a rotation axis of drum 120, a radial direction R, and a circumferential direction C. With special reference to FIG. 6, heated air 170 produced within heating assembly 140 may flow along the axial direction A into drum 120 (e.g., during a drying operation). Additionally or alternatively, heated water 172 produced within heating assembly 140 may be selectively supplied to washing machine appliance 100 (e.g., via a conduit such as conduit 130).

Heating assembly 140 may include vessel 146. As shown particularly in FIGS. 7 and 8, vessel 146 may be generally annular or donut shaped. Vessel 1146 may be positioned within duct 142. Duct 142 may include a rear panel 1421 and a radial edge 1422 extending from rear panel 1421 along the axial direction A and extending along the circumferential direction C. Accordingly, vessel 146 may be nested within duct 142. Ambient air may flow into duct 142 around vessel 146, where it may be heated by the hot water contained within vessel 146. For instance, heating element 156 (e.g., induction heating element 156) may be provided around duct 142. According to this embodiment, duct 142 is positioned between heating element 156 and vessel 146. As would be understood, heating element 156 may produce the magnetic field to heat vessel 146 (and the water contained within vessel 146) as well as duct 142.

Figure 9:
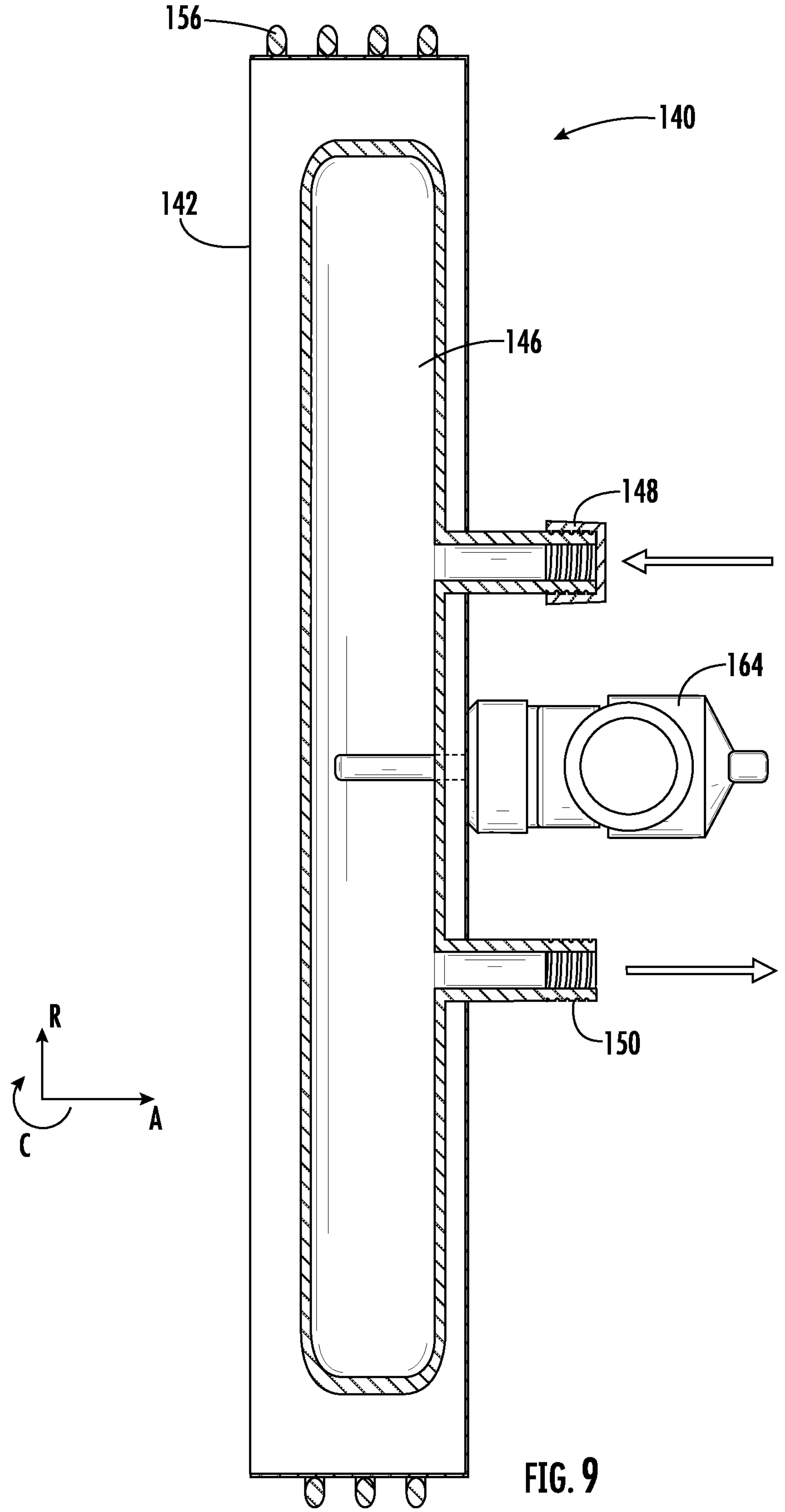
FIG. 9 provides a side section view of the exemplary heating assembly of FIG. 7 showing a water inlet, water outlet, and relief valve.

As shown in FIG. 9, water inlet 148 and water outlet 150 may be included with vessel 146. According to this embodiment, each of water inlet 148 and water outlet 150 may extend along the axial direction A. Additionally or alternatively, relief valve 164 may extend from vessel 146 along the axial direction A.

According to the embodiments described herein, the heating assembly may be configured to heat air flowing through a duct (e.g., duct 142) to be supplied to a drum for a drying operation. The heating assembly may include an induction heating element configured to heat up a vessel containing water. The heating element may be controlled to varying power levels to produce desired energy outputs for controlled heating. As the water stored within the vessel is heated (e.g., by the ferrous vessel), the heated water may assist in heating the air travelling through the duct. Additionally or alternatively, the hot water stored within the vessel may optionally be supplied to a washing machine appliance for use in a washing operation requiring water heated to a predetermined temperature. Advantageously, the air supplied to the duct is evenly heated over a period of time, increasing drying efficiency and performance. Moreover, particles such as lint are prevented from contacting the heating element. Further still, heated water may be provided to an attached washing machine for use in washing operations, reducing the need for additional energy to heat up municipal water.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A laundry treatment appliance comprising:
- a cabinet;
- a tub positioned within the cabinet, the tub defining a receiving space; and
- a heating assembly positioned within the cabinet, the heating assembly comprising:
  - a duct forming an air passageway in fluid communication with the tub, the duct defining an axial direction, a radial direction, and a circumferential direction;
  - a vessel positioned within the duct, the vessel configured to store a quantity of liquid;
  - a heating element provided around the vessel, the heating element configured to selectively provide heat to the vessel; and
  - a sleeve positioned around the heating element such that the heating element is positioned between the sleeve and the vessel, wherein the sleeve is tapered toward an upstream end of the air passageway along the axial direction, wherein the heating element is positioned outside of the air passageway.

2. The laundry treatment appliance of claim 1, wherein each of the vessel and the sleeve comprises a ferrous material.

3. The laundry treatment appliance of claim 1, wherein the heating element comprises an induction coil.

4. The laundry treatment appliance of claim 1, wherein the duct is a corrugated duct defining a helix along the axial direction of the air passageway.

5. The laundry treatment appliance of claim 1, wherein the vessel comprises a liquid inlet and a liquid outlet.

6. The laundry treatment appliance of claim 5, wherein the laundry treatment appliance is a dryer appliance operably coupled with a washing machine appliance, and wherein the liquid outlet is connected with a wash tub of the washing machine appliance to selectively provide heated liquid from the vessel thereto.

7. The laundry treatment appliance of claim 6, further comprising:
- a temperature sensor provided at the liquid outlet to determine a temperature of the liquid within the vessel; and
- a valve provided at the liquid outlet, wherein the valve is configured to selectively open and close according to the temperature of the liquid within the vessel.

8. The laundry treatment appliance of claim 1, further comprising:
- a coil spacer positioned between the heating element and the vessel to space the heating element from the vessel.

9. The laundry treatment appliance of claim 1, further comprising:
- a relief valve in fluid communication with the vessel, the relief valve being configured to selectively release the liquid from the vessel.

10. A heating assembly for a laundry treatment appliance, the laundry treatment appliance comprising a drum, the heating assembly comprising:
- a duct forming an air passageway in fluid communication with the drum, the duct defining an axial direction, a radial direction, and a circumferential direction;

a liquid vessel positioned within the duct, the liquid vessel configured to store a quantity of liquid, the liquid vessel being fluidly isolated from the air passageway;

a heating element provided around the liquid vessel, the heating element configured to selectively provide heat to the liquid vessel, wherein the heating element is positioned outside of the air passageway; and a sleeve positioned around the heating element such that the heating element is positioned between the sleeve and the liquid vessel, wherein the sleeve is tapered toward an upstream end of the air passageway along the axial direction.

11. The heating assembly of claim 10, wherein each of the liquid vessel and the sleeve comprises a ferrous material.

12. The heating assembly of claim 10, wherein the heating element comprises an induction coil.

13. The heating assembly of claim 10, wherein the duct is a corrugated duct defining a helix along the axial direction of the air passageway.

14. The heating assembly of claim 10, wherein the liquid vessel comprises a liquid inlet and a liquid outlet.

15. The heating assembly of claim 14, wherein the laundry treatment appliance is a dryer appliance operably coupled with a washing machine appliance, and wherein the liquid outlet is connected with a wash tub of the washing machine appliance to selectively provide heated liquid from the liquid vessel thereto.

16. The heating assembly of claim 15, further comprising:

a temperature sensor provided at the liquid outlet to determine a temperature of the liquid within the liquid vessel; and a valve provided at the liquid outlet, wherein the valve is configured to selectively open and close according to the temperature of the liquid within the liquid vessel.

17. The heating assembly of claim 10, further comprising:

a coil spacer positioned between the heating element and the liquid vessel to space the heating element from the liquid vessel.

18. The heating assembly of claim 10, further comprising:

a relief valve in fluid communication with the liquid vessel, the relief valve being configured to selectively release fluid from the liquid vessel.

19. A heating assembly for a laundry appliance having a tub, the heating assembly comprising:

a duct defining an air passageway fluidly coupled with the tub;

a vessel positioned within the duct, the vessel configured to store liquid;

a heating element circumferentially surrounding the vessel; and a sleeve overlaying the heating element to further define the air passageway as generally toroidal and cylindrical such that the heating element is positioned outside of the air passageway.

20. The heating assembly of claim 19, wherein the sleeve includes a tapered portion further defining the air passageway.

* * * * *